United States Patent [19]

Kato et al.

[11] Patent Number: 5,009,403
[45] Date of Patent: * Apr. 23, 1991

[54] FLUID-FILLED ELASTIC MOUNT

[75] Inventors: Rentaro Kato, Kasugai; Tatsuya Suzuki, Inuyama, both of Japan

[73] Assignee: Tokai Rubber Industries, Ltd., Aichi, Japan

[*] Notice: The portion of the term of this patent subsequent to Apr. 23, 2008 has been disclaimed.

[21] Appl. No.: 371,089

[22] Filed: Jun. 26, 1989

[30] Foreign Application Priority Data

Jul. 2, 1988 [JP] Japan .................................. 63-88082

[51] Int. Cl.$^5$ .............................................. F16M 5/00
[52] U.S. Cl. .................................. 267/140.1; 248/562; 267/219
[58] Field of Search .................. 267/140.1 A, 140.1 R, 267/140.1 AE, 141, 141.1, 141.2, 141.3, 141.4, 141.5, 219, 294, 35; 248/562, 636

[56] References Cited

U.S. PATENT DOCUMENTS

| | | | |
|---|---|---|---|
| 2,553,636 | 5/1951 | Dath | 267/294 |
| 4,383,679 | 5/1983 | Kakimoto | 267/153 |
| 4,418,897 | 12/1983 | Hartel et al. | 267/140.1 |
| 4,679,777 | 7/1987 | Gold et al. | 267/140.1 |
| 4,753,422 | 4/1988 | Thorn | 180/312 |
| 4,787,610 | 11/1988 | Kojima et al. | 267/122 |
| 4,809,959 | 3/1989 | Hourlier | 267/140.1 |
| 4,836,512 | 6/1989 | Lun | 267/140.1 |

FOREIGN PATENT DOCUMENTS

3019337A1 11/1981 Fed. Rep. of Germany .
0084430 4/1986 Japan .................................... 248/562

Primary Examiner—Matthew C. Graham
Attorney, Agent, or Firm—Oliff & Berridge

[57] ABSTRACT

A fluid-filled elastic mount including a first and a second support member; an elastic body for connecting the first and second support members; a first chamber filled with a non-compressible fluid and receiving a vibrational load applied to the mount; a second chamber filled with the fluid, at least partially defined by a flexible diaphragm and having a variable volume; an orifice for fluid communication between the two chambers; and a movable member movable by a predetermined distance between the two chambers. The movable member is formed of a rigid material and the orifice is provided in the movable member. The mount further includes a holding device for holding an outer peripheral portion of the movable member such that the movements of the movable member in the load-receiving direction are limited by butting contacts of the outer peripheral portion with a pair of contact surfaces of the holding device, and a pair of cushioning members secured to the contact surfaces of the holding device, respectively. A pair of cushioning members may be secured to one of a pair of contact surfaces of the outer peripheral portion of the movable member, and one of the pair of contact surfaces of the holding device which is opposed to the other contact surface of the outer peripheral portion of the movable member, respectively.

16 Claims, 2 Drawing Sheets

FLUID-FILLED ELASTIC MOUNT

BACKGROUND OF THE INVENTION

1. Field of the Invention

The present invention relates in general to a fluid-filled elastic mount which is capable of damping input vibrations based on flows of the fluid enclosed therein, and in particular to such a fluid-filled elastic mount which exhibits improved vibration-damping characteristic for vibrations in a comparatively high frequency range.

2. Discussion of the Prior Art

A mounting member such as an automotive engine mount is generally required to exhibit an excellent vibration-damping effect against input vibrations in a wide frequency range, particularly excellent vibration-damping characteristic against low-frequency large-amplitude vibrations and a sufficiently low dynamic spring constant or rate with respect to high-frequency small-amplitude vibrations.

In the light of the above requirements, there has been recently proposed a fluid-filled elastic mount of a type as disclosed in German Laid-Open Patent Application DE 30 19 337 A1. This fluid-filled elastic mount includes: (a) a first and a second support member which are spaced apart from each other in a load-receiving direction in which a vibrational load is applied to the elastic mount, (b) an elastic body for elastically connecting the first and second support members, (c) means for defining a pressure-receiving chamber between the first and second support members, the pressure-receiving chamber being filled with a non-compressible fluid and receiving the vibrational load applied to the elastic mount, (d) means for defining an equilibrium chamber between the first and second support members, the equilibrium chamber being filled with the non-compressible fluid, at least partially defined by a flexible diaphragm and having a variable volume, (e) means for defining a restricted passage for fluid communication between the pressure-receiving and equilibrium chambers, and (f) a movable member disposed between the pressure-receiving and equilibrium chambers such that the movable member is movable by a predetermined distance in the load-receiving direction so as to absorb a fluid-pressure difference between the pressure-receiving and equilibrium chambers.

The fluid-filled elastic mount of the type described above had been developed based on the knowledge that low-frequency vibrations have large amplitudes, against which an elastic mount is required to exhibit excellent vibration-damping characteristic, while high-frequency vibrations have small amplitudes, against which an elastic mount is required to provide a sufficiently low dynamic spring constant. Upon application of low-frequency large-amplitude vibrations to the known elastic mount, the movements of the movable member in the load-receiving direction cannot sufficiently accomodate or absorb a change in the fluid pressure of the pressure-receiving chamber, on the other hand the restricted passage (i.e., orifice) properly serves or operates to permit the fluid to flow therethrough so as to absorb the fluid-pressure change and thereby damp the input vibrations. This vibration-damping characteristic is proper to the orifice. Meanwhile, upon application of high-frequency small-amplitude vibrations, the movements of the movable member result in substantial fluid flows between the pressure-receiving and equilibrium chambers, thereby preventing an increase in the fluid pressure of the pressure-receiving chamber, namely avoiding an increase in the dynamic spring constant of the elastic mount due to a substantially closed condition of the orifice. Consequently the elastic mount exhibits a lowered dynamic spring constant for the input vibrations.

In the above fluid-filled elastic mount, it is preferred that the orifice have a sufficiently large cross-sectional area for the fluid flows therethrough and a sufficient length for the fluid flows therealong, to provide excellent damping characteristic for vibrations in a comparatively low frequency range. The above-indicated German Patent Application teaches forming the orifice in an outer peripheral portion of a partition member which separates the pressure-receiving and equilibrium chambers from each other, such that the orifice extends in the circumferencial direction of the partition member. Meanwhile, the above-indicated movable member is movably supported by an inner or central portion of the partition member surrounded by the outer peripheral portion defining the orifice.

In the above fluid-filled elastic mount, however, the effective area of the movable member, that is, cross-sectional area surrounded by the central portion of the partition member which area is effective to displace the fluids in the pressure-receiving and equilibrium chambers based on the movements of the movable member, is limited to a considerably small region because of the provision of the orifice. Consequently, the inner central portion of the partition member defining the above-indicated cross-sectional area, is placed in an unoperable condition as if it is closed, upon application of vibrations in a relatively low frequency range, whereby the movable member is not capable of providing a satisfactory, fluid pressure change-absorbing effect for vibrations in a relatively high frequency range.

SUMMARY OF THE INVENTION

It is therefore an object of the present invention to provide a fluid-filled elastic mount which is capable of exhibiting excellent vibration-damping characteristic for low-frequency large-amplitude vibrations based on the fluid flows through the orifice, and exhibiting excellent vibration-isolating characteristic or a sufficiently low dynamic spring constant with respect to high-frequency small-amplitude vibrations based on the movements of the movable member, i.e., fluid presssure change-absorbing effect of the same.

The above object has been achieved by the principle of the present invention. According to a first aspect of the present invention, there is provided a fluid-filled elastic mount including (a) a first and a second support member which are spaced apart from each other in a load-receiving direction in which a vibrational load is applied to the elastic mount, (b) an elastic body for elastically connecting the first and second support members, (c) means for defining a pressure-receiving chamber between the first and second support members, the pressure-receiving chamber being filled with a non-compressible fluid and receiving the vibrational load applied to the elastic mount, (d) means for defining an equilibrium chamber between the first and second support members, the equilibrium chamber being filled with the non-compressible fluid, at least partially defined by a flexible diaphragm, and having a variable volume, (e) means for defining a restricted passage for fluid communication between the pressure-receiving chamber and the equilibrium chamber, and (f) a movable member disposed between the pressure-receiving chamber and the equilibrium chamber such that the movable member is movable by a predetermined distance in the load-receiving direction so as to absorb a fluid-pressure difference between the pressure-receiving chamber and the equilibrium chamber, wherein the improvements comprise: (1) the movable member being formed of a rigid material and supporting the means for defining the restricted passage, (2) holding means fixedly supported by the second support member, for holding an outer peripheral portion of the movable member such that the movements of the movable member in the load-receiving direction are limited by butting contacts of the outer peripheral portion of the movable member with a pair of contact surfaces of said holding means, and (3) a pair of cushioning members secured to the pair of contact surfaces of the holding means, respectively, the outer peripheral portion of the movable member being subjected to shock-absorbing butting contacts with the pair of contact surfaces of the holding means via the pair of cushioning members.

In the fluid-filled elastic mount of the present invention constructed as described above, the means for defining the restricted passage (that is, orifice) is supported by the movable member, which is displaceably held at the outer peripheral portion thereof by the holding means. Accordingly, the cross-sectional area for the substantial fluid flows between the pressure-receiving and equilibrium chambers due to the movements of the movable member (hereinafter, referred to as "fluid-flow area" when appropriate), is not limited by the provision of the orifice, in contrast to the known elastic mount disclosed by the previously-indicated German Patent Application. The inner peripheral portion of the holding means which defines the above-indicated fluid-flow area, is not placed in a closed condition upon application of relatively low frequency vibrations to the elastic mount. Thus, the movable member provides the effect of absorbing a difference between the fluid pressures in the pressure-receiving and equilibrium chambers. Therefore, the instant elastic mount exhibits excellent vibration-damping characteristic, i.e., a sufficiently low dynamic spring constant against vibrations in a wide frequency range including vibrations in a comparatively high frequency range.

In addition, since the cushioning members are provided between the outer peripheral portion of the movable member, and the contact surfaces of the holding means, the outer peripheral portion of the movable member and the contact surfaces of the holding means indirectly contact each other via the cushioning members, which leads to avoiding shocks otherwise produced by direct contacts thereof upon application of vibrations and thereby preventing or attenuating rattling noises and/or vibrations resulting from such contacts.

According to a feature of the present invention, each of the cushioning members has a predetermined height as measured from a corresponding one of the pair of contact surfaces of the holding means in the load-receiving direction.

According to another feature of the present invention, the outer peripheral portion of the movable member consists of an annular collar extending outwardly from the movable member, the annular collar being subjected to the shock-absorbing butting contacts with the pair of contact surfaces of the holding means.

According to yet another feature of the present invention, each of the cushioning members has at least one annular lip formed integral therewith.

According to a further feature of the present invention, one of the pair of cushioning members is formed integral with the elastic body, while the other cushioning member is formed integral with the flexible diaphragm.

According to a still further feature of the present invention, the cushioning members are formed of rubber.

In a preferred embodiment of the elastic mount of the present invention, the second support member comprises a base member which has an outer planar portion, and a calking member which has an outer calking portion calked against the periphery of the outer planar portion of the base member and which has an inner flanged portion with a generally L-shaped cross section, the holding means comprising the outer planar portion and the generally L-shaped inner flanged portion which cooperate with each other to define an annular groove in which the outer peripheral portion of the movable member is held, the pair of contact surfaces of the holding means consisting of a pair of inner surfaces of the outer planar portion and the generally L-shaped inner flanged portion which surfaces define the annular groove, the pair of cushioning members being sucured to the pair of inner surfaces, respectively, the outer peripheral portion of the movable member being subjected to the shock-absorbing butting contacts with the inner surfaces via the cushioning members.

In another embodiment of the elastic mount of the present invention, the movable member comprises a first generally cylindrical member having the outer peripheral portion, while the means for defining the restricted passage comprises a second generally cylindrical member having a helical groove formed in an outer circumferential surface thereof, the second cylindrical member being fitted in the first cylindrical member such that the helical groove is closed by an inner circumferential surface of the first cylindrical member so as to provide the restricted passage which communicates with the pressure-receiving and equilibrium chambers, the outer periperal portion of the movable member consisting of an annular collar extending radially outwardly of the first cylindrical member. In this case, the second cylindrical member may be formed of an elastic material.

In yet another embodiment of the elastic mount of the present invention, the second support member comprises a base member which is attached at a central portion thereof to a body of an automotive vehicle, and a calking member which is calked against the periphery of an outer planar portion of the base member, an outer peripheral portion of the flexible diaphragm being held under pressure between the base member and the calking member calked against the base member. In this case, the flexible diaphragm may include an annular rigid member which is pressed against the outer planar portion of the base member of the second support member with the outer peripheral portion of the flexible diaphragm being held under pressure between the base and calking members.

In a further embodiment of the present invention, the elastic mount further comprises a restrictor member which is at least partially embedded in the elastic body, the restrictor member having a generally annular shape.

According to a second aspect of the present invention, there is provided a fluid-filled elastic mount including (a) a first and a second support member which are spaced apart from each other in a load-receiving direction in which a vibrational load is applied to the elastic mount, (b) an elastic body for elastically connecting the first and second support members, (c) means for defining a pressure-receiving chamber between the first and second support members, the pressure-receiving chamber being filled with a non-compressible fluid and receiving the vibrational load applied to the elastic mount, (d) means for defining an equilibrium chamber between the first and second support members, the equilibrium chamber being filled with the non-compressible fluid, at least partially defined by a flexible diaphragm, and having a variable volume, (e) means for defining a restricted passage for fluid communication between the pressure-receiving chamber and the equilibrium chamber, and (f) a movable member disposed between the pressure-receiving chamber and the equilibrium chamber such that the movable member is movable by a predetermined distance in the load-receiving direction so as to absorb a fluid-pressure difference between the pressure-receiving chamber and the equilibrium chamber, wherein the improvements comprise (1) the movable member being formed of a rigid material and supporting the means for defining the restricted passage, (2) holding means fixedly supported by the second support member, for holding an outer peripheral portion of the movable member such that the movements of the movable member in said load-receiving direction are limited by butting contacts of a first pair of contact surfaces of the outer peripheral portion of the movable member with a second pair of contact surfaces of the holding means, and (3) a pair of cushioning members secured to one of the first pair of contact surfaces, and one of the second pair of contact surfaces which is opposed to the other of the first pair of contact surfaces, respectively, the first pair of contact surfaces being subjected to shock-absorbing butting contacts with the second pair of contact surfaces via the pair of cushioning members, respectively.

BRIEF DESCRIPTION OF THE DRAWINGS

The above and optional objects, features and advantages of the present invention will be better understood by reading the following detailed description of a presently preferred embodiment of the invention, when considerd in conjunction with the accompanying drawings, in which.

DETAILED DESCRIPTION OF THE PREFERRED EMBODIMENT

Figure 1:
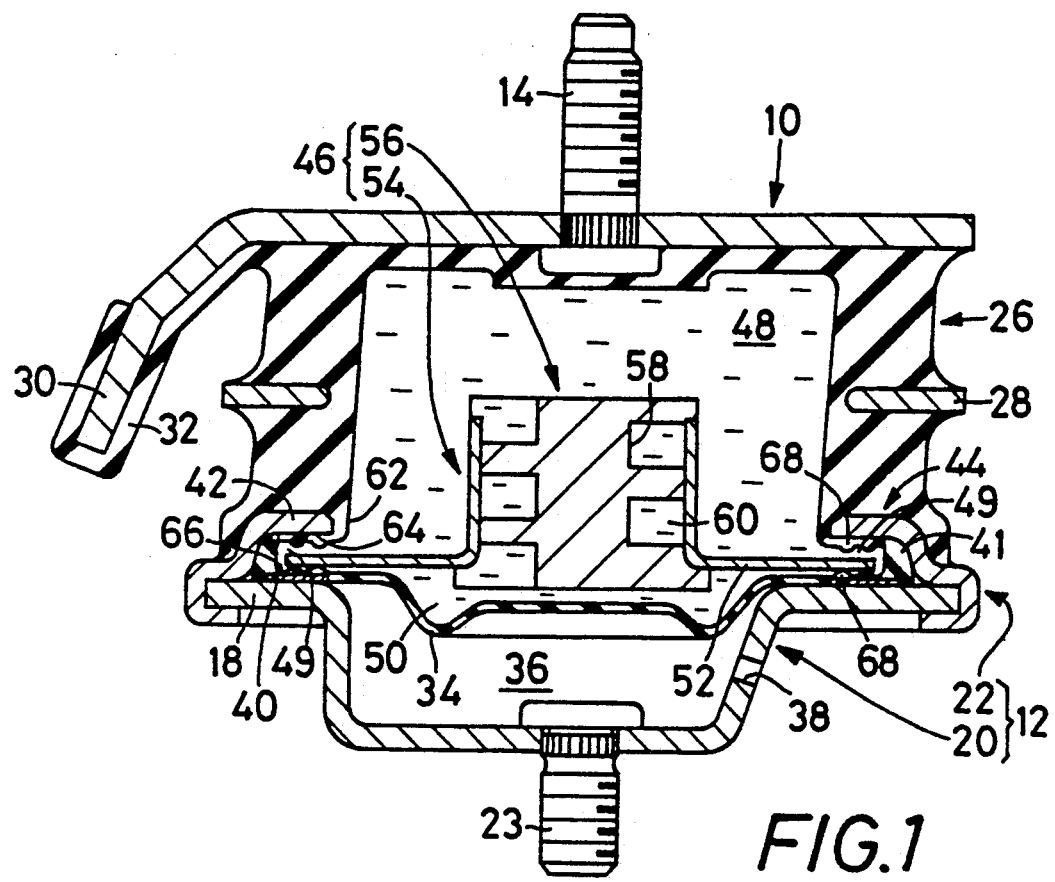
FIG. 1 is an elevational view in vertical cross section of one embodiment of a fluid-filled elastic mount of the present invention in the form of an engine mount.
Figure 4:
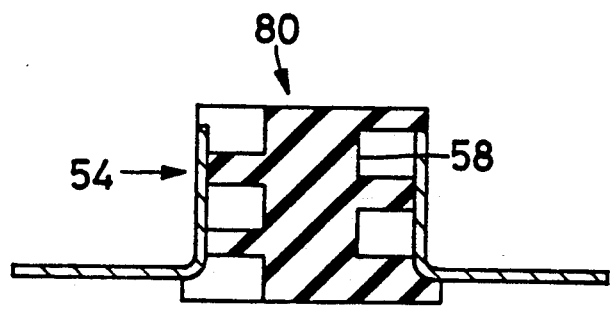
FIG. 4 is a cross-section of a second embodiment of a movable member of the elastic mount.
Figure 2:
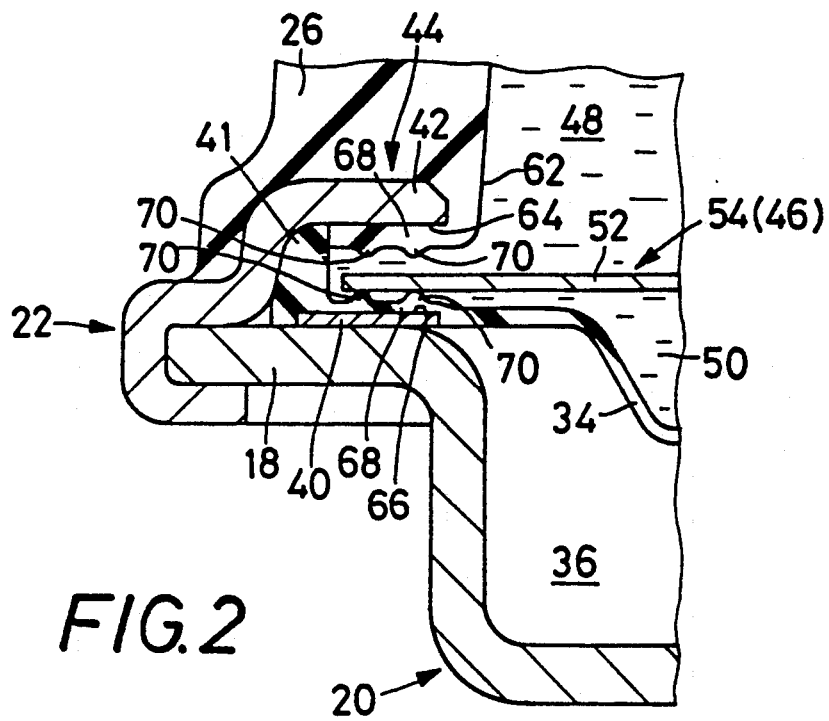
FIG. 2 is an enlarged fragmentary view in vertical cross section partially illustrating the engine mount of FIG. 1.

Referring first to FIGS. 1 and 2 there is shown a fluid-filled elastic mount in the form of an engine mount used for mounting an engine unit on the body of a motor vehicle. In the figures, reference numerals 10 and 12 denote a first and a second support member which are formed of a metallic material. These first and second support members 10, 12 are spaced apart from each other by a suitable distance in a direction in which a vibrational load is applied to the instant engine mount, i.e., in the top-bottom direction of FIG. 1. This direction will be referred to as "load-receiving direction" when appropriate.

The first support member 10 has a generally planar configuration. A mounting bolt 14 is secured to the outer surface of the first support member 10 such that the mounting bolt 14 extends outwardly of the engine mount in the load-receiving direction. The second support member 12 consists of a generally cylindrical base member 20 and an annular calking member 22. The base member 20 includes an inner, shallow-cup-shaped bottom portion and an outer, planar annular flange 18. The calking member 22 includes an outer calking portion calked against the periphery of the outer planar flange 18 of the base member 20, and an inner flanged portion 42 having a generally L-shaped cross section. A mounting bolt 23 is secured to a central portion of the outer surface of the base member 20 such that the mounting bolt 23 extends outwardly of the engine mount in the load-receiving direction.

The first and second support members 10, 12 are elastically connected to each other by an elastic body 26 of rubber, such that the open end of the second support member 12 is positioned on the side of the first support member 10. The elastic body 26 has a generally cylindrical shape with a bottom wall, and is vulcanized at the bottom end thereof to the first support member 10 and at the open end thereof to the calking member 22 of the second support member 20. Thus, the first and second support members 10, 12 are fixed to the elastic body 26 in a fluid-filled manner. An annular restrictor member 28 of metal is embedded in the outer circumferential surface of an axially intermediate portion of the elastic body 26.

The instant engine mount is installed on the motor vehicle such that the first support member 10 is attached to a member or part on the side of the engine unit via the mounting bolt 14, while the second support member 12 is attached via the mounting bolt 23 to a member or part on the side of the vehicle body, and that an axis of the engine mount is inclined by a predetermined angle with respect to the load-receiving direction, i.e., the top-bottom direction of FIG. 1. Thus, the engine mount damps vibrations transmitted from or to the engine unit to or from the vehicle body.

A stopper portion 30 extends from a portion of the outer periphery of the first support member 10 toward the second support member 12, namely, generally downwardly in the top-bottom direction of FIG. 1. The stopper portion 30 is brought into butting contact with a mating member (not shown) disposed on the side of the second support member 12 (or the vehicle body), so as to prevent the first and second support members 10, 12 from being excessively largely displaced relative to each other in the load-receiving direction upon application of vibrations to the engine mount. The stopper portion 30 is covered with a rubber member 32 substantially all over the outer surface thereof, so that the rubber member 32 absorbs shocks resulting from the butting contact of the stopper portion 30 with the above-indicated mating member or the other members of the engine mount. The rubber member 32 is formed integral with the elastic body 26.

A flexible diaphragm 34 substantially formed of rubber is fixedly supported by the second support member 12 such that a thick-walled, outer peripheral portion 41 of the flexible diaphragm 34 is fluid-tightly held under pressure between the outer planar flange 18 of the base member 20 and the inner flanged portion 42 of the calking member 22. The flexible diaphragm 34 closes the open end of the elastic body 26 so as to define a fluid-tight enclosure filled with a suitable non-compressible fluid such as water, alkylene glycol, polyalkylene glycol and silicone oil. Meanwhile, the flexible diaphragm 34 and the shallow-cup-shaped bottom portion of the second support member 12, cooperate with each other to define a void 36, which communicates with the atmosphere or ambient air via a through-hole 38 formed through the bottom portion. Since the void 36 is in communication with the atmosphere, the void 36 permits the flexible diaphragm 34 to be elastically deformed, i.e., inflated and deflated, by a sufficient amount.

The flexible diaphragm 34 includes an annular thin plate 40 of metal secured to the rubber mass thereof adjacent to the thick-walled peripheral portion 41. The outer periphery of the annular thin plate 40 is pressed against the outer planar flange 18 of the base member 20 with the thick-walled peripheral portion 41 being held under pressure between the base and calking members 20, 22. In this way, the flexible diaphragm 40 is fixedly supported by the second support member 12.

The generally L-shaped inner flanged portion 42 of the annular calking member 22 is spaced apart from the outer planar flange 18 of the base member 20 by a suitable distance in the load-receiving direction, and is opposed to the annular thin plate 40 located on the outer planar flange 18 with a suitable distance therebetween in the same direction. Thus, the annular thin member 40 and the inner flanged portion 42 cooperate with each other to define an annular groove 49 opening radially inwardly of the second support member 12. The outer planar flange 18 of the base member 20, the inner flanged portion 42 of the calking member 22, and others cooperate with each other to serve as holding means 44 for movably or displaceably holding a movable member 46 described below in detail, in the fluid-tight enclosure filled with the non-compressible fluid.

Due to the provision of the movable member 46, the fluid-tight enclosure is divided into a pressure-receiving chamber 48 on the side of the elastic body 26 (or the first support member 10), and an equilibrium chamber 50 on the side of the flexible diaphragm 34 (or the second support member 12). Upon application of a vibrational load to the instant engine mount, the pressure-receiving chamber 48 receives the vibrational load through elastic deformation of the elastic body 26, and the fluid pressure in the pressure-receiving chamber 48 is changed. Meanwhile, the equilibrium chamber 50 is partially defined by the flexible diaphragm 34, and therefore has a variable volume filled with the non-compressible fluid. Upon input of a vibrational load to the engine mount, the flexible diaphragm 34 is deformed due to a change in the fluid pressure of the equilibrium chamber 50, whereby the volume of the equilibrium chamber 50 is changed. Accordingly, substantially no change will take place in the fluid pressure of the equilibrium chamber 50.

The movable member 46 includes an outer generally cylindrical member 54 and an inner generally cylindrical member 56 which are formed of a rigid material such as metal. The outer cylindrical member 54 has an outer annular flange or collar 52 extending radially outwardly from one of opposite axial open ends thereof. The inner cylindrial member 56 is fitted in the inner cylindrical space of the outer cylindrical member 54, and the outer cylindrical member 54 is subjected to drawing so as to reduce the diameter thereof and thereby securely fix the inner and outer members 54, 56 to each other. The inner cylindrical member 56 consists of a solid body, and substantially fills the inner cylindrical space of the outer cylindrical member 54.

The inner cylindrical member 56 has a helical groove 58 formed in the outer circumferential surface thereof and extending in the circumferential direction thereof. With the inner cylindrical member 56 fitted in the outer cylindrical member 54, the helical groove 58 opening in the outer circumferential surface of the inner cylindrical body 56 is closed by the inner circumferential surface of the outer cylindrical member 54, so as to provide an orifice 60 which communicates with the pressure-receiving chamber 48 and the equilibrium chamber 50, respectively. The dimensions of the orifice 60, such as a circumferential length and a cross-sectional area of flow, are so determined as to suitably damp vibrations in a comparatively low frequency range, such as engine shake. That is, the input vibrations are damped based on a predetermined resistance to the fluid flows through the orifice 60, or based on resonance of the fluid masses existing in the orifice 60.

The annular collar 52 of the movable member 46 is held in the annular groove 49 of the holding means 44, with suitable clearances or loosenesses left therebetween in the load-receiving direction, so that the movable member 46 is movable by a predetermined distance in the load-receiving direction. Thus, the movements of the movable member 46 in the load-receiving direction are limited by butting contacts of the opposite surfaces of the annular collar 52 with inner surfaces 64, 66 of the inner flanged portion 42 and the annular thin plate 40 defining the annular groove 49. In other words, the movable member 46 is displaceable by the predetermined distance in the load-receiving direction between the pressure-receiving and equilibrium chambers 48, 50.

Upon application of a vibrational load to the instant engine mount, the movable member 46 is displaced so as to absorb a difference between the fluid pressures of the pressure-receiving and equilibrium chambers 48, 50. Therefore, substantial fluid flows are caused due to the displacements of the movable member 46 between the pressure-receiving and equilibrium chamber 48, 50 through a communication hole 62 of the holding means 44 which is defined by the inner flanged portion 42 of the calking member 22. Thus, changes in the fluid pressure of the pressure-receiving chamber 48 upon application of vibrations to the engine mount can be absorbed by the fluid flows due to the displacements of the movable member 46.

As shown in FIG. 2, the opposed inner surfaces 64, 66 of the inner flanged portion 42 and the annular thin plate 40 defining the annular groove 49, are provided with a pair of annular cushioning members 68, 68 formed of rubber with a suitable thickness, respectively. Upon application of vibrations to the engine mount, the annular collar 52 of the movable member 46 is subjected to shock-absorbing butting contacts with the inner surfaces 64, 66 of the annular groove 49 via the cushioning members 68. In the present embodiment, the cushioning member 68 secured to the surface 64 of the inner flanged portion 42 of the calking member 22, is formed integral with the elastic body 26, while the cushioning member 68 secured to the surface 66 of the annular thin plate 40 is formed integral with the flexible diaphragm 34. Further, each cushioning member 68 has a pair of concentric annular lips 70, 70 formed integral therewith on the butting surface thereof and extending in the circumferential direction thereof. The annular lips 70, having excellent elastic characteristic, serve to more suitably absorb shocks produced by the butting contacts of the annular collar 52 with the holding means 44.

In the engine mount constructed as described above, upon application of low-frequency large-amplitude vibrations thereto, the displacements of the movable member 46 cannot absorb changes in the fluid pressure in the pressure-receiving chamber 48, and the orifice 60 properly operates to permit the fluid flows therethrough, so that the engine mount exhibits excellent vibration-damping characteristic for the input vibrations. Meanwhile, upon exertion of intermediate- or high-frequency low-amplitude vibrations to the engine mount, at which the orifice 60 is substantially closed, the displacements of the movable member 46 effectively absorb changes in the fluid pressure of the pressure-receiving chamber 48, so that the engine mount exhibits a sufficiently lowered dynamic spring constant for the input vibrations.

In the instant engine mount, since the orifice 60 is provided in the movable member 46, the communication hole 62 of the holding means 44 has a larger fluid-flow area, i.e., cross-sectional area for the substantial fluid flows between the pressure-receiving and equilibrium chambers 48, 50 due to the displacements of the movable member 46, than in the previously-described known elastic mount. Thus, the instant engine mount is free from the problem that the above-indicated fluid-flow area is limited to a considerable small area because of the provision of a member or part defining the orifice, which problem has been encountered in the prior art. The communication hole 62 of the holding means 44 are so dimensioned as to effectively isolate vibrations in a comparatively high frequency range based on resonance of the fluid masses therein. The communication hole 62 are not placed in an unoperable condition as if it is closed, upon application of vibrations in a relatively low frequency range, as in the known elastic mount. Consequently the instant engine mount exhibits a sufficiently low dynamic spring constant effective to damp vibrations in a wide frequency range including a comparatively high range.

Measurements of the present inventors have demonstrated that the fluid-flow area, i.e., cross-sectional area for the fluid flows due to the displacements of the movable member 46, in the instant engine mount is about four times as large as that in the known elastic mount disclosed by the previously-indicated German Patent Application, in which the orifice is provided in the outer peripheral portion of the partition member and the movable member is disposed at the inner or central portion of the partition member surrounded by the orifice. Therefore, the communication hole 62 in the instant engine mount can be adapted such that the hole 62 is placed in an unoperable condition as if it is closed, upon exertion thereto of vibrations having a frequency about twice as high as that for the above-indicated known elastic mount.

The resonance frequency of the fluid masses flowing through the communication hole 62 due to the displacements of the movable member 46, is varied depending upon various parameters such as the mass of the movable member 46 acting as a vibrator, in addition to the elastic properties of the elastic body 26 and the viscosity and specific gravity of the non-compressible fluid enclosed. As the mass of the movable member 46 is lowered, the resonance frequency of the fluid masses is raised, that is, higher frequency vibrations can be isolated based on resonance of the fluid masses.

The movable member 46 is required to have a certain degree of rigidity, because the movable member 46 serves to separate the pressure-receiving and equilibrium chambers 48, 50 from each other and is held at the outer annular collar 52 thereof by the holding means 44. Therefore, it is necessary to prevent the rigid movable member 46 (specifically, annular collar 52) from directly colliding with the metallic holding means 44 (18, 42), and thereby prevent rattling noises and/or vibrations resulting from the collisions. To this end the inner surfaces 64, 66 of the holding means 44 are provided with the cushioning members 68, 68, which serve to suitably absorb impacts produced upon butting contacts of the annular collar 52 with the holding means 44, thereby effectively preventing or attenuating abnormal noises and/or vibrations resulting from the impacts.

Since the helical orifice 60 with several turns is provided in the radially outer portion of the generally cylindrical movable member 46, the orifice 60 has a sufficient length for the fluid flows therethrough, so that the engine mount exhibits improved vibration-damping characteristic for vibrations in a comparatively low frequency range, in addition to the previously-described, sufficiently low dynamic spring constant for vibrations in a wide frequency range including a comparatively high frequency range.

Figure 3:
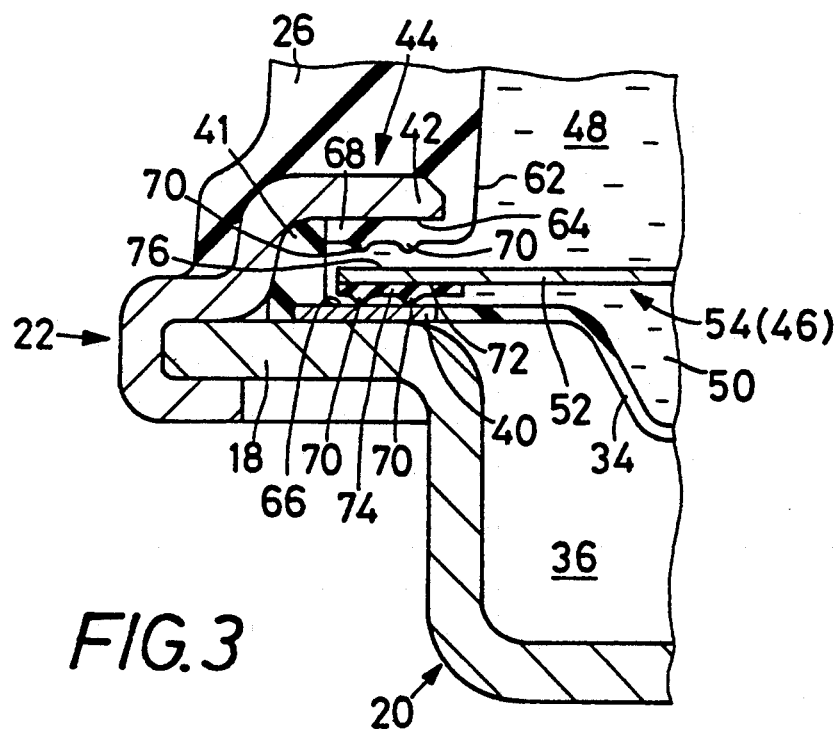
FIG. 3 is a view corresponding to FIG. 2, partially illustrating another engine mount embodying the present invention.

Referring next to FIG. 3 there is shown another embodiment of the fluid-filled elastic mount of the present invention also in the form of an automotive engine mount. The present embodiment is different from the preceding embodiment only with respect to cushioning members disposed between the outer annular collar 52 of the movable member 46 and the inner surfaces 64, 66 of the holding means 44. The same reference numerals as used in the preceding embodiment of FIGS. 1 and 2, are used in FIG. 3 to designate corresponding elements or parts of the present engine mount. Repetitive description of those elements or parts is abbreviated.

In contrast to the preceding embodiment, the annular thin plate 40 in the present embodiment is not provided on the surface 66 thereof with a cushioning member. However, an annular cushioning member 74 is secured to one surface 72 of opposite surfaces 72, 76 of the annular collar 52 which surface is opposed to the surface 66 of the annular plate 40, for preventing direct butting contact therebetween. The annular cushioning member 74 has a suitable thickness and extends in the circumferential direction of the annular collar 52. A pair of concentric annular lips 70, 70 are formed integral with the cushioning member 74, as in the preceding embodiment.

The cushioning member 74 serves to absorb or attenuate shocks resulting from the butting contacts of the annular collar 52 with the annular plate 40 upon application of vibrations to the engine mount. Meanwhile, the butting contacts of the other surface 76 of the annular collar 52 with the opposed surface 64 of the inner flanged portion 42, occurs via the cushioning member 68 secured to the surface 64 of the inner flanged portion 42, as in the preceding emobodiment, so as to absorb or attenuate shocks resulting from the butting contacts.

Thus, the instant arrangement of the cushioning member 74 with respect to the annular collar 52 and the holding means 44, effectively operates to prevent or reduce rattling noises and/or vibrations resulting from the butting contacts betweeen those members 52, 44 upon application of low-frequency large-amplitude vibrations, in particular, to the engine mount, as in the preceding emodiment.

While the presently preferred embodiments of the invention has been described with particularities for illustrative purposes only, it is to be understood that the invention is by no means limited to the details of the embodiments, but may be otherwise embodied.

For example, while in the illustrated embodiments, of FIGS. 1—3, both the inner and outer cylindrical members 54, 56 are formed of a rigid material, it is possible to use an inner cylindrical member (80) formed of an elastic material such as resin or rubber, since the inner solid member 80 is externally supported by the outer rigid member 54. In this case, it is permitted to press-fit the inner elastic solid member 80 in the outer rigid member 54.

Further, although in the illustrated embodiments the helical orifice 60 is formed in the radially outer portion of the cylindrical body of the movable member 46, it is possible to use a movable member 46 consisting of a pair of rigid plate-like members which are superposed on each other in the load-receiving direction and form an orifice 60 in the mating surfaces of the superposed members in the circumferential direction thereof.

Further, the illustrated arrangement of the holding means 44 with respect to the annular collar 52 of the movable member 46, for movably holding the movable member 46, may be replaced by another arrangement in which the second support member 12 securely supports an annular holding member and the annular holding member is loosely fitted between a pair of outer annular flanges of the movable member 46 which are spaced apart from each other in the load-receiving direction. In this case, too, the movable member 46 is displaceable in the load-receiving direction by a predetermined distance, which is defined by the pair of outer annular flanges of the movable member 46 with which the opposite surfaces of the annular holding member are subjected to butting contacts upon application of vibrations to the engine mount.

Also, the annular lips 70 formed on the butting surfaces of the cushioning members 68, 74 may be omitted although the lips 70 are effective to provide a more excellent shock-absorbing effect. Cushioning members 68, 74 formed of a soft rubber material exhibit a high cushioning effect comparable with that of the illustrated lips 70. Further, it is possible to use cushioning members 68, 74 having a configuration similar to that of the lips 70.

Moreover, it is possible to arrange the cushioning members 68 such that the cushioning members 68 secured to the surfaces 64, 66 are in pressed contact with the opposite surfaces of the annular collar 52, namely, without any clearances or loosenesses left between the cushioning members and the opposite surfaces of the annular collar 52. In this case, the elastic deformation (compression) of the cushioning members 68 permits the movable member 46 to be displaced by a suitable distance in the load-receiving direction of the engine mount. The displacements of the movable member 46 in the load-receiving direction are limited by the indirect contacts of the annular collar 52 with the inner surfaces 64, 66 of the holding means 44 through elasticity of the cushioning members 68. This is also true of the cushioning member 74 secured to the surface 72 of the annular collar 52.

Furthermore, while the present invention has been described in the embodiment in the form of the automotive engine mount, the principle of the invention may be applied to various other mounting members such as those used in vibration-generating machines.

It is to be understood that the present invention may be embodied with various other changes, modifications and improvements that may occur to those skilled in the art without departing from the scope and spirit of the invention defined in the appended claims.

What is claimed is:

1. A fluid-filled elastic mount comprising:

a first and second support member which are spaced apart from each other in a load-receiving direction in which a vibrational load is applied to the elastic mount;

an elastic body for elastically connecting said first and support members;

means for defining a pressure-receiving chamber between said first and second support members, said pressurereceiving chamber being filled with a noncompressible fluid and receiving said vibrational load applied to the elastic mount;

means for defining an equilibrium chamber between said first and second support members, said equilibrium chamber being filled with said non-compressible fluid, at least partially defined by a flexible diaphragm, and having a variable volume;

means for defining a restricted passage for fluid communication between said pressure-receiving chamber and said equilibrium chamber;

a movable member disposed between said pressurereceiving chamber and said equilibrium chamber such that said movable member is movable by a predetermined distance in said loadreceiving direction so as to absorb a fluid-pressure difference between the pressure-receiving chamber and the equilibrium chamber, said movable member being formed of a rigid material and supporting said means for defining said restricted passage;

holding means fixedly supported by said second support member, for holding an outer peripheral portion of said movable member such that the movements of said movable member in said load-receiving direction are limited by butting contacts of said outer peripheral portion of the movable member with a pair of contact surfaces of said holding means; and a pair of cushioning members secured to said pair of contact surfaces of said holding means, respectively, said outer peripheral portion of said movable member being subjected to shockabsorbing butting contacts with said pair of contact surfaces of said holding means via said pair of cushioning members, wherein said movable member comprises a first generally cylindrical member having said outer peripheral portion, while said means for defining said restricted passage comprises a second generally cylindrical member having a helical groove formed in an outer circumferential surface thereof, said second cylindrical member being fitted in said first cylindrical member so that said restricted passage is provided by said helical groove closed by an inner circumferential surface of said first cylindrical member.

2. The fluid-filled elastic mount as set forth in claim 1, wherein each of said cushioning members has a predetermined height as measured from a corresponding one of said pair of contact surfaces of said holding means in said load-receiving direction.

3. The fluid-filled elastic mount as set forth in claim 1, wherein said outer peripheral portion of said movable member consists of an annular collar extending outwardly from the movable member, said annular collar being subjected to said shock-absorbing butting contacts with said pair of contact surfaces of said holding means.

4. The fluid-filled elastic mount as set forth in claim 1, wherein each of said cushioning members has at least one annular lip formed integral therewith.

5. The fluid-filled elastic mount as set forth in claim 1, wherein one of said pair of cushioning members is formed integral with said elastic body, while the other cushioning member is formed integral with said flexible diaphragm.

6. The fluid-filled elastic mount as set forth in claim 1, wherein said cushioning members are formed of rubber.

7. The fluid-filled elastic mount as set forth in claim 1, wherein said second support member comprises a base member which has an outer planar portion, and a calking member which has an outer calking portion calked against the periphery of said outer planar portion of said base member and which has an inner flanged portion with a generally L-shaped cross section, said holding means comprising said outer planar portion and said generally L-shaped inner flanged portion which cooperate with each other to define an annular groove in which said outer peripheral portion of said movable member is held, said pair of contact surfaces of said holding means consisting of a pair of inner surfaces of said outer planar portion and said generally L-shaped inner flanged portion which surfaces define said annular groove, said pair of cushioning members being secured to said pair of inner surfaces, respectively, said outer peripheral portion of said movable member being subjected to said shock-absorbing butting contacts with said inner surfaces via said cushioning members.

8. The fluid-filled elastic mount as set forth in claim 1, wherein said outer periperal portion of said movable member comprises an annular collar extending radially outwardly of said first cylindrical member.

9. The fluid-filled elastic mount as set forth in claim 1, wherein said second cylindrical member is formed of an elastic material.

10. The fluid-filled elastic mount as set forth in claim 1, wherein said second support member comprises a base member which is attached at a central portion thereof to a body of an automotive vehicle, and a calking member which is calked against the periphery of an outer planar portion of said base member, an outer peripheral portion of said flexible diaphragm being held under pressure between said base member and said calking member calked against said base member.

11. The fluid-filled elastic mount as set forth in claim 10, wherein said flexible diaphragm includes an annular rigid member which is pressed against said outer planar portion of said base member of said second support member with said outer peripheral portion of the flexible diaphragm being held under pressure between said base and calking members.

12. The fluid-filled elastic mount as set forth in claim 1, further comprising a restrictor member which is at least partially embedded in said elastic body, said restrictor member having a generally annular shape.

13. The fluid-filled elastic mount as set forth in claim 1, wherein said second cylindrical member is formed of a rigid material.

14. A fluid-filled elastic mount comprising:
a first and a second support member which are spaced apart from each other in a load-receiving direction in which a vibrational load is applied to the elastic mount;
an elastic body for elastically connecting said first and second support members;
means for defining a pressure-receiving chamber between said first and second support members, said pressurereceiving chamber being filled with a non-compressible fluid and receiving said vibrational load applied to the elastic mount;
means for defining an equilibrium chamber between said first and second support members, said equilibrium chamber being filled with said non-compressible fluid, at least partially defined by a flexible diaphragm, and having a variable volume;
means for defining a restricted passage for fluid communication between said pressure-receiving chamber and said equilibrium chamber;
a movable member disposed between said pressurereceiving chamber and said equilibrium chamber such that said movable member is movable by a predetermined distance in said loadreceiving direction so as to absorb a fluid-pressure difference between the pressure-receiving chamber and the equilibrium chamber, said movable member being formed of a rigid material and supporting said means for defining said restricted passage;
holding means fixedly supported by said second support member, for holding an outer peripheral portion of said movable member such that the movements of said movable member in said load-receiving direction are limited by butting contacts of a first pair of contact surfaces of said outer peripheral portion of the movable member with a second pair of contact surfaces of said holding means; and
a pair of cushioning members secured to one of said first pair of contact surfaces, and one of said second pair of contact surfaces which is opposed to the other of said first pair of contact surfaces, respectively, said first pair of contact surfaces being bought into shock-absorbing butting contacts with said second pair of contact surfaces via said pair of cushioning members, respectively,
wherein said movable member comprises a first generally cylindrical member having said outer peripheral portion, while said means for defining said restricted passage comprises a second generally cylindrical member having a helical groove formed in an outer circumferential surface thereof, said second cylindrical member being fitted in said first cylindrical member so that said restricted passage is provided by said helical groove closed by an inner circumferential surface of said first cylindrical member.

15. The fluid-filled elastic mount as set forth in claim 14, wherein said second cylindrical member is formed of a rigid material.

16. The fluid-filled elastic mount as set forth in claim 14, wherein said second cylindrical member is formed of an elastic material.

* * * * *